(12) United States Patent
Klumperman et al.

(10) Patent No.: US 9,457,321 B2
(45) Date of Patent: Oct. 4, 2016

(54) FURANONE CONTAINING POLYMER COMPOUND WITH BACTERIA-ADHESION PROPERTIES

(71) Applicant: Stellenbosch University, Stellenbosch, Western Cape Province (ZA)

(72) Inventors: Lubertus Klumperman, Leiderdorp (NL); Osama Esmail Bshena, Stellenbosch (LY); Thomas Eugene Cloete, Somerset West (ZA); Nonjabulo Prudence Gule, Somerset West (ZA)

(73) Assignee: STELLENBOSCH UNIVERISTY (ZA)

( * ) Notice: Subject to any disclaimer, the term of this patent is extended or adjusted under 35 U.S.C. 154(b) by 0 days.

(21) Appl. No.: 14/415,406

(22) PCT Filed: Jul. 19, 2013

(86) PCT No.: PCT/IB2013/055948
§ 371 (c)(1),
(2) Date: Jan. 16, 2015

(87) PCT Pub. No.: WO2014/013475
PCT Pub. Date: Jan. 23, 2014

(65) Prior Publication Data
US 2015/0202574 A1    Jul. 23, 2015

(30) Foreign Application Priority Data
Jul. 20, 2012  (ZA) .................. 2012/05454

(51) Int. Cl.
*C08F 212/08* (2006.01)
*C08F 222/40* (2006.01)
*C08F 8/00* (2006.01)
*C08F 8/14* (2006.01)
*B01D 65/08* (2006.01)
*B01D 71/38* (2006.01)
*B01D 71/62* (2006.01)
*B01D 71/80* (2006.01)

(52) U.S. Cl.
CPC .............. *B01D 65/08* (2013.01); *B01D 71/38* (2013.01); *B01D 71/62* (2013.01); *B01D 71/80* (2013.01); *C08F 8/00* (2013.01); *C08F 8/14* (2013.01); *C08F 212/08* (2013.01); *B01D 2321/168* (2013.01)

(58) Field of Classification Search
CPC .......... C08F 212/08; C08F 8/00; C08F 8/14; C08F 8/30; C08F 8/32; C08F 12/08; B01D 65/08; B01D 71/38; B01D 71/62; B01D 71/80; B01D 2321/168
See application file for complete search history.

(56) References Cited

U.S. PATENT DOCUMENTS 3,748,144 A * 7/1973 Ford, Jr. .................. C08F 8/00 430/287.1
2009/0318616 A1  12/2009 Stopek et al.

FOREIGN PATENT DOCUMENTS

WO    2011/095867 A1    8/2011

OTHER PUBLICATIONS

International Search Report date of mailing Nov. 19, 2013 for PCT/IB2013/055948. (10 pages).
Nonjabulo P. Gule et al: "Immobilized Furanone Derivatives as Inhibitors for Adhesion of Bacteria on Modified Poly (styrene-co-maleic anhydride)"—Biomacromolecules, vol. 13, No. 10, Sep. 4, 2012, pp. 3138-3150 XPO55087947.
Hume E B H et al: "The control of *Staphylococcus epidermis* biofilm formation and in vivo infection rates by covalently bound furanones"—Biomaterials, Elsevier Science Publisher BV., Barking, GB, vol. 25, No. 20, Sep. 1, 2004, pp. 5023-5030.
Baveja J K et al: "Biological performance of a novel synthetic furanone-based antimicrobial"—Biomaterials, Elsevier Science Publishers BV., Barking, GB vol. 25, No. 20, Sep. 1, 2004, pp. 5013-5021.

* cited by examiner

*Primary Examiner* — Irina S Zemel
*Assistant Examiner* — Jeffrey Lenihan
(74) *Attorney, Agent, or Firm* — Fitch Even Tabin & Flannery LLP (57) ABSTRACT

A polymer compound (I) with bacteria-adhesion inhibition properties against bacteria such as *P. aeruginosa* Xen 5, *E. coli* Xen 14, *S. typhimurium* Xen 26, *S. aureus* Xen 36 and *K. pneumoniae* Xen 39 is described. The group R is provided by a substituted furanone linked by an alkyl chain or, more preferably a hydrophilic moiety such as oligo(ethylene oxide) $((CH_2-CH_2-O)_x)$ to the polymer backbone. The group R may be the same or different along the polymer backbone. The invention also provides nanofibers and coatings which include a polymer compound as defined above.

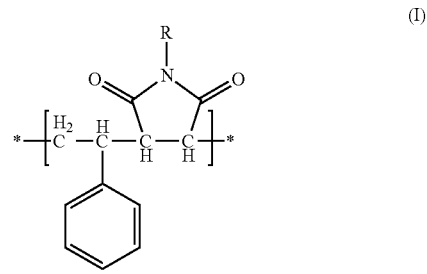

14 Claims, 7 Drawing Sheets

Figure 1: Overlaid ATR-FTIR of SMA and SMA/Furanone 1 showing the conversion of SMA into the furanone-containing version.

Figure 2: Nanofiber diameters of SMA/Furanone 1 (A) and of SMA/Furanone 2 (B) and pore sizes of SMA/Furanone 1 (C) and of SMA/Furanone 2 (D) nanofiber mats.

Figure 3: Antimicrobial (A) and cell-adhesion inhibition (B) potential of SMA/Furanone 1 nanofibrous mats over 30 minutes and 36 hours respectively. The pristine SMA control experiments are shown as the dashed virtually horizontal curves

Figure 4: Antimicrobial (A) and cell-adhesion inhibition (B) potential of SMA/Furanone 2 nanofibrous mats over 30 minutes and 36 hours respectively. The pristine SMA control experiments are shown as the dashed virtually horizontal curves.

Figure 5: Antimicrobial (A) and attachment-inhibition (B) potential of nanofibrous mats on mixed strains.

| Description | Pristine nanofibrous SMA mats (controls) | Furanone-modified nanofibrous mats |
|---|---|---|
| Furanone 1 | | |
| Furanone 2 | | |

Figure 6: *In vivo* images illustrating the antimicrobial efficacy of the furanone-modified nanofibrous mats after 10 minutes of exposure of a mixed culture

| Description | Total colonies | Dead colonies |
|---|---|---|
| Pristine SMA (control) |  A₁ |  A₂ |
| SMA/Furanone 1 |  B₁ |  B₂ |
| SMA/Furanone 2 |  C₁ |  C₂ |

Figure 7: Fluorescence microscopy images showing cell-adhesion inhibition and antimicrobial efficacy of the furanone-modified nanofibrous mats.

Figure 8: GC-MS spectra indicating that furanone compounds did not leach from nanofibrous mats into the filtered water.

FURANONE CONTAINING POLYMER COMPOUND WITH BACTERIA-ADHESION PROPERTIES

CROSS-REFERENCE TO RELATED APPLICATIONS

This application is a U.S. national phase application filed under 35 U.S.C. §371 of International Application PCT/IB2013/055948, filed on Jul. 19, 2013, designating the United States, which claims priority from South African Application Number 2012/05454, filed Jul. 20, 2012, which are hereby incorporated herein by reference in their entirety.

FIELD OF THE INVENTION

This invention relates to a polymer compound with bacteria-adhesion inhibition properties.

BACKGROUND TO THE INVENTION

Even though membrane filtration is a promising technology, its large-scale industrial applicability is limited partly due to poor intrinsic membrane properties, but largely because of fouling of the membranes. The use of chemical biocides such as chlorine to control biofouling of membranes is widespread. However, most of these chemical biocides are not very effective at higher pH values and they react with dissolved chemicals to produce harmful by-products. Physical means to clean membranes like pigging, brushing, swabbing and jetting have been reported, but only work best as secondary methods to other biofilm removal methods. The use of bacteriophages, electrical current and nutrient control have also been explored, but these methods are either host specific or can take a long time to work and are not very cost effective.

The focus is now moving to modification of membrane surfaces in order to control fouling. Various metal elements in different oxidation states such as silver, copper, zinc, nickel, manganese, iron and lithium have been reported to possess antimicrobial properties. Some of these metals have been blended with polymers and made into fibers for use in filter media, wound dressing and other applications.

Quorum sensing (QS) is a process by which bacteria communicate, and forms an essential part of biofilm formation. Over the past few years, many publications and large amounts of data have become available on bacterial QS and interest among researchers in modulating QS using different approaches has increased. QS is not necessary for bacterial survival but helps in coordinating the community-based bacterial behavior. Therefore, the inhibition of QS only interrupts the desired phenotype. Biofilms are highly resistant to antibiotics and disinfection treatments and this results in persistent human infections and detrimental corrosion and equipment failure in industrial settings. Modification of surfaces and new inhibitor designs have been investigated for the control of biofilm formation in industrial settings.

Biofilm formation in filtration membranes is one of the major limitations associated with membrane technology. This reduces the quality and quantity of water in water purification systems and consequently results in higher treatment costs. Interference with QS may not bring about a universally beneficial effect, but makes the bacteria more susceptible to control or destruction by traditional means.

Furanone moieties have been found to have various medicinal properties, such as anticancer, cardiotonic, analgesic, antimicrobial, antiviral, antifungal, and anti-inflammatory properties. The use of furanone derivatives that inhibit QS in microorganisms is not a new phenomenon. Biochemical studies to understand different pathways of QS have been carried out. Furanone derivatives have been isolated from nature and have also been synthesized. Specific QS routes for these furanone derivatives have been reported. Research on clinical applications of furanone compounds is widespread. In a recent article, inhibition of QS by the furanone moiety was reported to have prevented soft rot caused by *Pseudomonas aeruginosa* from attacking onion plants. Hume et al. have coupled a furanone to polystyrene and used melt moulding to make disks having from 5 to 8% furanone on their surfaces which have up to 89% reduction of *S. epidermidis* biofilm formation. They also coated catheters with their polymer for in vivo tests which showed that furanone may have been worn or leached off in between 65 and 85 days.

This shows the potential and wide applicability of furanone-mediated QS inhibition. Furanones are analogs of homoserine lactones that appear to interfere with the development of typical biofilm structure, leaving these organisms more susceptible to treatment with biocides. Targeting QS is also advantageous compared to the use of antibiotics since there is no risk of the bacteria developing resistance, which causes serious control problems. Many natural products contain the core 3(2H)-furanone structure classified as a lactone. Because of the high synthetic and biological importance of furanone compounds, their chemistry has received considerable attention over the past two decades.

SUMMARY OF THE INVENTION

In accordance with this invention there is provided a polymer compound with bacteria-adhesion inhibition properties having the formula wherein R is selected from Furanone A

Furanone B and wherein at least one of the substituents $R_1$, $R_2$, $R_3$, and $R_4$ is a linking group towards the polymer backbone, typically an alkyl chain or, more preferably a hydrophilic moiety such as oligo(ethylene oxide) $((CH_2—CH_2—O)_i)$; and for the remaining substituents to be one or more of hydrogen, halide, alkyl, or aryl.

Further features of the invention provide for the substituents to provide an external double bond to the polymer backbone; preferably for $R_1$ and $R_2$ to be combined into one substituent linked via a double bond to the furanone in furanone A, and for $R_3$ and $R_4$ to be combined into one substituent linked via a double bond to the furanone in furanone B.

Still further features of the invention provide for each R to be the same or different along the polymer backbone.

Yet further features provide for R to be selected from

Further features provide for the polymer compound wherein bacteria-adhesion inhibition properties against bacteria include *P. aeruginosa* Xen 5, *E. coli* Xen 14, *S. typhimurium* Xen 26, *S. aureus* Xen 36 and *K. pneumoniae* Xen 39 individually and in mixed cell culture form.

The invention also provides nanofibres and coatings which include a polymer compound as defined above, in particular there is provided a nanofibrous material which includes a polymer compound with bacteria-adhesion inhibition properties having the formula wherein R is selected from Furanone A

Furanone B and wherein at least one of the substituents $R_1$, $R_2$, $R_3$, and $R_4$ is a linking group towards the polymer backbone typically an alkyl chain or, more preferably a hydrophilic moiety such as oligo(ethylene oxide) $((CH_2—CH_2—O)_i)$ and the remaining substituents are one or more of hydrogen, halide, alkyl, or aryl.

Further features provide for the substituents to provide an external double bond to the polymer backbone; preferably for $R_1$ and $R_2$ to be combined into one substituent linked via a double bond to the furanone in furanone A, and for $R_3$ and $R_4$ to be combined into one substituent linked via a double bond to the furanone in furanone B.

Still further features provide for each R to be the same or different along the polymer backbone.

Yet further features provide for R to be selected from

BRIEF DESCRIPTION OF THE DRAWINGS

The invention will now be described, by way of example only with reference to the accompanying drawings in which.

DETAILED DESCRIPTION WITH REFERENCE TO THE DRAWINGS

A polymer compound with bacteria-adhesion inhibition properties is provided and has the formula R is selected from where at least one of the substituents $R_1$, $R_2$, $R_3$, and $R_4$ forms the linking group towards the polymer backbone provided by poly(styrene-co-maleic anhydride). The linking group is typically an alkyl chain or, more preferably a hydrophilic moiety such as oligo(ethylene oxide) $((CH_2-CH_2-O)_i)$. The remaining substituents are one or more of hydrogen, halide, alkyl, or aryl.

The substituents could also provide an external double bond to the polymer backbone. In this form, $R_1$ and $R_2$ are preferably combined into one substituent linked via a double bond to the furanone in furanone A, and $R_3$ and $R_4$ are combined into one substituent linked via a double bond to the furanone in furanone B.

Each furanone, R, can be the same or different along the polymer backbone.

The following examples demonstrate two furanone-modified poly(styrene-co-maleic anhydride) compounds according to the invention.

Materials

A commercial grade of poly(styrene-co-maleic anhydride) ($M_w$ 110 000) containing about 28 wt % maleic anhydride as a statistical copolymer was donated by Polyscope, Geleen, the Netherlands (Grade SZ 28110), 2,5-dimethyl-4-hydroxy-3(2H)-furanone (DMHF, 98%), butadiene monoxide (98%), acryloyl chloride, 2,2-(aminoethoxy) ethanol (98%), iodine ($I_2$, 99%) and sodium hydride (NaH, 95%) were obtained from Sigma Aldrich, South Africa and used without further purification. Boc oxide (($Boc)_2O$, 98%), Grubbs (II) catalyst (97%), sodium hydrogen carbonate ($NaHCO_3$, 99.5%) and sodium thiosulfate ($Na_2S_2O_3$, 99%) were obtained from Merck chemicals. The solvents and acids (tetrahydrofuran (THF) 99.9%, diethyl ether (98%), ethyl acetate (99.8%), triethyl amine (99.5%) dichloromethane (DCM, 99.8%), p-toluenesulfonic acid (98%), phosphoric acid ($H_3PO_4$, 95%) and toluene (99.8%)) used in this study were all purchased from Sigma Aldrich. The bacterial strains *E. coli* Xen 14, *S. tymphimurium* Xen 26, *P. aeruginosa* Xen 5, *K. pneumoniae* Xen 39 and *S. aureus* Xen 36 were obtained from Caliper Life Sciences, Hopkinton Mass., USA. The bacterial strains contain a *Photorhabdus luminescence* luxABCDE operon (lux gene) to produce the enzyme luciferase, which emits photons in the presence of ATP and oxygen.

Synthesis of Furanone 1

To a magnetically stirred mixture of 2-(2-(aminoethoxy) ethanol 20.67 mL (1 mmol) and ($Boc)_2O$ 10.50 g (1 mmol), a catalytic amount of iodine 2.53 g (10 mol %) was added under solvent-free conditions at room temperature. After stirring the reaction mixture for 3 hours, diethyl ether (10 mL) was added. The reaction mixture was washed with aqueous $Na_2S_2O_3$ solution (5%, 5 mL) and saturated $NaHCO_3$ solution. The organic layer was dried over $Na_2SO_4$ and the solvent was evaporated under reduced pressure. The product was further purified using silica gel chromatography with ethyl acetate and triethylamine (7:1) as solvent system. This step was followed by vacuum evaporation to remove any residual solvent resulting in the desired Boc-protected 2-(2-(aminoethoxy) ethanol (1). While stirring, 20 mL THF was gradually added to 6.82 g product 1 (0.036 mol) followed by 1.03 g NaH (1.2 equivalent). The reaction temperature was lowered to −20° C. using a HAAKE Thermo DC5-K75 cryostat. When the temperature reached −20° C. and the hydrogen gas had completely evolved, 2.50 g butadiene monoxide (0.036 mol) was added to the reaction mixture and stirred for a further 1 hour. The reaction was then stirred for a further 16 hours at room temperature. Water (20 mL) was slowly added with stirring until $H_2$ evolution ceased. The organic layer was separated using $CH_2Cl_2$, washed with $H_2O$ and dried using 10 g $Na_2SO_4$ to give 6.16 g (90.32%) of 2. To alcohol 2 (6 g, 0.022 mol), 2.33 g (0.26 mol) acrolyl chloride and 5 mL ether were added. The mixture was then poured into water and the organic layer was separated. Excess volatiles were removed via vacuum evaporation and 5.88 g of product 3 (98%) was obtained. Product 3 (5.50 g, 0.017 mol) was ring-closed via metathesis by adding 3.29 g (0.01 mol) Grubbs' second-generation catalyst, giving the Boc-protected 5-(2-(2-aminoethoxyl)ethoxy)methyl)-2(5H)furanone (4), which after deprotection with $H_3PO_4$ in the presence of toluene yielded 84% product (5). Further purification by column chromatography on silica was dismissed due to losses in product yields when these were repeatedly columned. $^1$H-NMR (600 MHz, $CDCl_3$): δ=3.42 (m, 2H), 3.58 (m, 5H), 3.81 (m, 2H), 4.42 (s, 2H), 4.98 (m, 1H), 5.35 (m=1H), 6.32 (s=2H).

The reaction occurs according to the following scheme:

Synthesis of Furanone 2

The amine group in 2-(2-aminoethoxyl)ethanol was Boc-protected as described in the previous section and the resultant Boc-protected product (1) was reacted with 2,5-dimethyl-4-hydroxy-3-(2H)-furanone (2.0 g) in a 250 mL round bottom flask in the presence of p-toluenesulfonic acid (100 mg) and anhydrous ethanol (80 mL). A drying tube was attached to the top of the reflux condenser, and the mixture refluxed for 6 hours. The mixture was then cooled, shaken with solid NaHCO$_3$ (5 g), and filtered through a 2 mm layer of NaHCO$_3$ to remove the acid catalyst. The product contained both the starting material and the Boc-protected product, possibly because the p-toluenesulfonic acid deprotected 2-(2-aminoethoxyl)ethanol. Column chromatography was used to purify the Boc-protected 4-(2-(2-aminoethoxy)-2,5-dimethyl-3(2H)-furanone. This was followed by deprotection using 4 equiv H$_3$PO$_4$ in the presence of toluene as the solvent giving a 78% yield.

The molar masses of 5-(2-(2-aminoethoxyl)ethoxy)methyl)-2(5H)furanone and 4-(2-(2-aminoethoxy)-2,5-dimethyl-3(2H)-furanone were confirmed by electron spray mass spectrometry. ES-MS spectra confirmed the molar masses of 5-(2-(2-aminoethoxyl)ethoxy)methyl)-2(5H)furanone and 4-(2-(2-aminoethoxy)-2,5-dimethyl-3(2H)-furanone to be m/z 215.01 and m/z 201.1 respectively. This corresponds to calculated molar masses of 215.101 g for 5-(2-(2-aminoethoxyl)ethoxy)methyl)-2(5H)furanone and 201.110 g for 4-(2-(2-aminoethoxy)-2,5-dimethyl-3(2H)-furanone. $^1$H NMR (600 MHz, CDCl$_3$): δ=1.22 (s, 3H), 2.16 (s, 3H), 2.98 (m, 2H), 3.32 (m, 4H), 3.62 (m, 2H), 3.74 (m.1H), 6.67 (s, 2H).

The reaction occurs according to the following scheme:

Immobilization of Furanone Compounds onto SMA

In a three-necked round-bottomed flask equipped with a stirrer, 0.5 g SMA (0.0025 mol MAnh) was placed and N,N-dimethyl formamide (DMF) (20 mL) was added as a solvent. Then the solution was stirred at 70° C. After complete dissolution of SMA, 1 g 4-(2-(2-aminoethoxy)-2,5-dimethyl-3(2H)-furanone (0.0051 mol) was added dropwise with continuous stirring. This resulted in gelation of the reactants, vigorous stirring as well as increasing the temperature to 150° C. resulting in a clear gold solution. This solution was then dehydrated using rotary evaporation followed by vacuum evaporation to remove any residual solvents to give the final product in a yield of 91%. In the case of 5-(2-(2-aminoethoxyl)ethoxy)methyl)-2(5H)furanone, 1.069 g SMA (0.0051 mol MAnh) and 1.026 g 5-(2-(2-aminoethoxyl)ethoxy)methyl)-2(5H)furanone (0.0051 mol) were used.

Immobilization occurs according to the following reaction scheme.

NMR Spectroscopy

One-dimensional ¹H NMR spectra were acquired with a Varian Unity Inova 600 MHz NMR spectrometer with 5 mm broadband probe at 293 K in deuterated chloroform (CDCl$_3$). Relaxation delays of 1 second and frequencies of 600 MHz were used for the ¹H NMR. Spectra were internally referenced to TMS. All peaks are reported in ppm downfield of TMS.

Electron Spray Mass Spectrometry

ES-MS was carried out using a Waters API Q-TOF Ultima equipped with a Waters UPLC. The sample (3 µL) was injected at a capillary voltage of 3.5 kV, cone voltage of 35 V and RFI value of 50. The source temperature was maintained at 80° C. and the desolvation temperature at 350° C. The desolvation gas was set at 350 L/h and the cone gas at 50 L/h.

ATR/FTIR

To confirm the immobilization of the furanone compounds onto SMA, ATR-FTIR spectroscopy was performed. A Nexus FT-IR provided by Nicolet Thermo equipped with a FTIR gas analyzer was used for ATR-FTIR studies. The spectrometer was fitted with a diamond crystal and measurements were taken in the 600 cm⁻¹ to 4000 cm⁻¹ infra-red range at a resolution of 6 cm⁻¹. The spectra were based on a total of 32 scans per sample.

Electrospinning

The modified polymers (SMA/5-(2-(2-aminoethoxy) ethoxy)methyl)-2(5H)furanone (SMA/Furanone 1) and SMA/4-(2-(2-aminoethoxy)-2,5-dimethyl-3(2H)-furanone (SMA/Furanone 2)) were dissolved in (1:1) mixtures of ethanol and methanol to form 10% wt/vol electrospinning solutions. Pristine SMA dissolved in THF was used for control experiments. Bubble electrospinning which is described in detail by Gule and coworkers was used for nanofibre production. All the polymer solutions were electrospun at room temperature. The widget-collector distance used was 20 cm and the relative humidity was maintained between 45 and 60% for continuous fibre formation. The applied voltage used was between 45 and 50 kV. The nanofibrous mats were crosslinked by heat treatment at 120° C. for 15 minutes.

Antimicrobial and Cell-Adhesion Inhibition Characterization

To determine the antimicrobial efficiency of the nanofibres, the basic plate counting technique was adopted. These tests were confirmed with bioluminescent imaging and LIVE/DEAD BacLight to determine the antimicrobial efficiency against viable but non-culturable (VBNC) cells. This was done to quantify the cells that enter a dormant state during contact with the antimicrobial fibres and to eliminate the chances of overestimating the antimicrobial efficiency of the nanofibres.

Plate Counts

*Klebsiella pneumoniae* Xen 39, *Staphylococcus aureus* Xen 36, *Escherichia coli* Xen 14, *Pseudomonas aeruginosa* Xen 5 and *Salmonella typhimurium* Xen 26 were used to test the antimicrobial and cell-adhesion inhibition properties of the modified polymers. Each pathogen was cultured in 10 mL Brain Heart Infusion (BHI) broth (Biolab Diagnostics) along with the appropriate antibiotics overnight on a rotating wheel at 37° C. For each strain, cells were pelleted by 10 min centrifugation at 3000 rpm, and washed 3 times with physiological water. Spiked water samples were prepared by inoculating 10⁶ CFU/mL of each strain into 500 mL sterile physiological water. Several control (cell viability) experiments (not reported here) were carried out to verify the absence of osmotic lysing, which often occurs when cells (especially gram negative) are removed from rich media into physiological water. The CFU/mL were measured using a Biorad Smart Spec™ plus spectrophotometer. The spiked water was then filtered through pristine SMA (control) or furanone-modified nanofibrous mats. The nanofibres were then rinsed several times using 10 mL physiological water to wash off all remaining bacterial cells and the wash-off water was plated out on BHI agar plates to determine living cells. This was done after specific contact periods to determine cell death as a function of time. After incubating the plates overnight at 37° C., colony counting was used to determine the antimicrobial effect of the filters. The experiment was performed for each pathogen and each specific contact period in triplicate. In order to mimic a real life scenario where bacteria species co-exist, 20 µL of each pathogen from the 10⁶ CFU/mL stock was inoculated into the same tube containing 10 mL BHI broth to make a cocktail of the strains and antimicrobial tests were conducted as described previously.

Cell-Adhesion Inhibition Characterization

The cell-adhesion inhibition capacity of the furanone-modified nanofibrous mats was carried out. To do this, weighed (10 mg) furanone-modified nanofibrous mats were cultured in BHI (10 mL) media containing *E. coli* Xen 14, *S. tymphimurium* Xen 26, *P. aeruginosa* Xen 5, *K. pneumoniae* Xen 39 and *S. aureus* Xen 36. After culturing these strains overnight, the nanofibrous mats were removed from the culture media and rinsed in physiological water to remove unattached colonies. This was followed by plate counting, bioluminescence imaging and fluorescence imaging techniques to ascertain the degree of attachment inhibition by the furanone derivatives. Real biofilm development and biofilm architecture were not studied and future studies on these nanofibres will explore these details.

Bioluminescent Imaging (BLI)

Bioluminescent imaging (BLI) is a relatively new development, which uses the light emitted from genetically modified living organisms as a tool for molecular imaging in small laboratory animals. BLI offers a method that is sensitive and innocuous and only allows live or viable cells to be detected. This technique measures cell viability by quantifying total photons emitted by the cells. In order to apply the BLI system in the antimicrobial evaluation, engineered bacterial strains obtained from Caliper Life Sciences (Hopkinton Mass., USA) were used for the assessment in this study. The bacterial strains have a *Photorhabdus luminescence* luxABCDE operon (lux gene) to produce the enzyme luciferase, which emits photons in the presence of ATP and oxygen. These photons indicate metabolic activity in the pathogens. Research on BLI corresponded with plate counting data with a correlation efficiency of about 0.98. The same procedure as described in the previous section was used but instead of washing out the filter and plating out, the filter was placed in a XENOGEN VIVO VISION In Vivo Imaging Lumina System (IVIS) supplied by Caliper Life Science and the Living Image® 3.1 Software was used to process them. Imaging was performed immediately after filtering the spiked water through the furanone-modified nanofibrous mats and also after 10 minutes exposure to monitor the level of bioluminescence emitted by the strains.

Fluorescence Experiments

Furanone-modified and control nanofibrous mats (10 mg) were exposed to the pathogen cocktail described in the "plate counts" section along with the appropriate antibiotics overnight on a rotating wheel at 37° C. These mats were then taken out of the media using forceps and rinsed lightly using physiological water. LIVE/DEAD BacLight kit with SYTO 9 and propidium iodide fluorescent dyes purchased from Molecular Probes Inc. were used to stain the specimen for imaging purposes. SYTO 9 stains all cells green, while propidium iodide penetrates cells whose cell membrane has been damaged and stains them red. Viable and total counts can be obtained in one staining step. Staining was done by incubation of samples with 6.5 µM dye at room temperature for 10 min. These samples were then observed on an Olympus Cell® system attached to an IX-81 inverted fluorescence microscope equipped with a F-view-II cooled CCD camera (Soft Imaging Systems). Using a Xenon-Arc burner (Olympus Biosystems GMBH) as light source, images were excited with the 472 nm or 572 nm excitation filter. Emission was collected using a UBG triple-band-pass emission filter cube. For the image frame acquisition, an Olympus Plan Apo N 60x/1.4 Oil objective and the Cell® imaging software were used. Images were processed and background-subtracted using the Cell® software.

Gas Chromatograph Coupled Mass Spectroscopy (GC-MS)

The leaching of chemical compounds into the environment is often accompanied by health and pollution concerns. To determine if the furanone derivatives did not leach into filtered water, water filtered through the nanofibrous mats was screened for traces of furanones using Gas Chromatography coupled to Mass Spectrometry (GC-MS). As a positive control, distilled water spiked with 0.02 M 5-(2-(2-aminoethoxyl)ethoxy)methyl)-2(5H)furanone (furanone 1) was analyzed and distilled water was used as a negative control. GC-MS was performed using a Waters GCT spectrometer equipped with CTC CombiPAL Autosampler a DB XLB column (30 m, 0.25 mm ID, 0.1 µm film thickness) was utilized. Solid phase microextraction (SPME) vials were used in the analysis and the headspace of the samples were analysed using a CTC PAL auto sampler.

Results

Synthesis and Characterization of Furanone Compounds

The importance of SMA copolymers is attributed to their usage in a number of areas for various purposes. Its applications comprise of additives that are used to upgrade properties of styrenic polymeric material, coating additives, binder application, additives for building materials, microcapsules, blend compatibilizer, adhesion promoter for polyolefin coatings on metals and medical and pharmaceutical applications. SMA copolymer is also regarded as a functional or reactive polymer. The functionality is brought about by the maleic anhydride in the backbone of the copolymer. The maleic anhydride in the backbone of SMA is reactive towards nucleophilic reagents ($H_2O$, alcohols, thiols, ammonia, amines, etc). Introduction of nucleophilic compounds enables the synthesis of new materials. SMA was chosen for these experiments because of its ease in reacting with amines.

Two furanone compounds with dangling amines (5-(2-(2-aminoethoxyl)ethoxy)methyl)-2(5H)furanone and 4-(2-(2-aminoethoxy)-2,5-dimethyl-3(2H)-furanone), referred to as Furanone 1 and Furanone 2, were synthesized.

ATR/FTIR Spectroscopy

Figure 1:
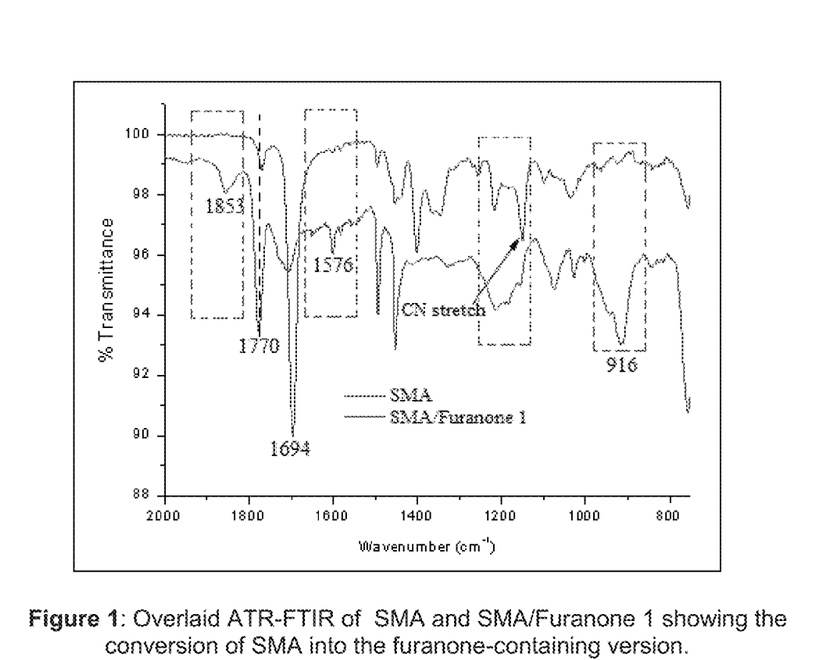
FIG. 1 is an overlaid ATR-FTIR of SMA and SMA/Furanone 1 showing the conversion of SMA into the furanone-containing version.

ATR/FTIR spectroscopy was used to confirm successful immobilization of the furanone moiety on SMA. FIG. 1 compares the ATR/FTIR spectra of pristine SMA with that of SMA modified with furanone 1. The absorption peak at 1185 $cm^{-1}$ is characteristic of the amide stretch. The formed imide groups around 1694 $cm^{-1}$ confirm the imidization step and are characteristic of the asymmetric and symmetric C=O stretching vibrations. The complete disappearance of the peak at 1853 $cm^{-1}$ indicates full conversion of the anhydride ring. The signals at 1576 $cm^{-1}$ and around 1500 $cm^{-1}$ are caused by (C=C) stretching of the aromatic ring and (C—H) bending vibration of the aromatic ring respectively. The band at 916 $cm^{-1}$ is due to cyclic anhydride groups.

Morphology of the Nanofibers

Figure 2:
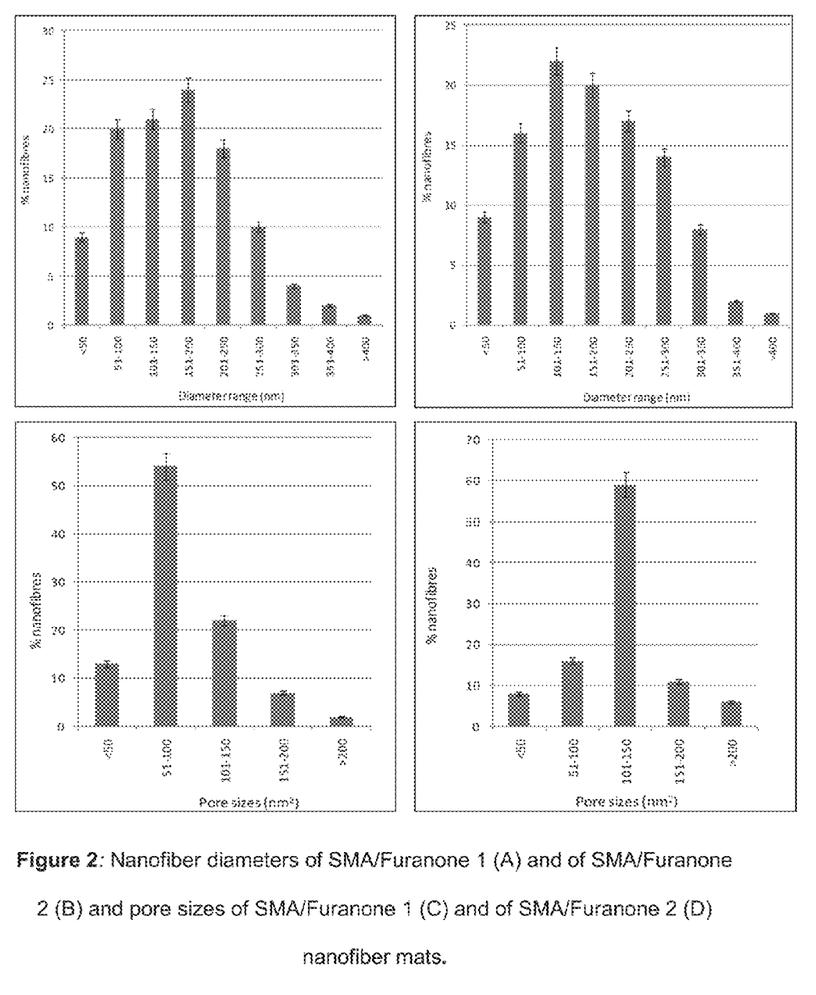
FIG. 2 shows nanofiber diameters of SMA/Furanone 1 (A) and of SMA/Furanone 2 (B) and pore sizes of SMA/Furanone 1 (C) and of SMA/Furanone 2 (D) nanofiber mats.

Both SMA/Furanone 1 and SMA/Furanone 2 nanofibers exhibited smooth morphology with no solvent beading. Individual fibers in these mats had diameters averaging between 120 and 220 nm (FIGS. 2A and 2B). Although there is no specific diameter range for nanofibrous materials in filter applications, according to the filtration theory, smaller fiber diameters give better filtration efficiency. This is because thinner fibers result in high surface to volume ratios, which are advantageous for filtration application. This was a good property since it increased the surface area for water filtration. These nanofibrous mats also had average pore sizes of less than 120 $nm^2$ (FIGS. 2C and 2D). The sizes of the mat pores are very important for this study since, for accuracy in measuring antimicrobial efficacy, the pores have to be smaller than the sizes of the studied bacteria strains. The recorded pore sizes were all less than 250 $nm^2$ and therefore appropriate for further tests.

The nanofibrous materials of the present invention offer a significant advantage of a high surface area compared to, for example, solid disks formed by melt moulding of polymers formed from polystyrene-furanone polymers known in the art, and the fact that the nanofibrous materials can readily be used in coating as well as in filtration applications.

Antimicrobial and Cell-Adhesion Inhibition Determination

Figure 3:
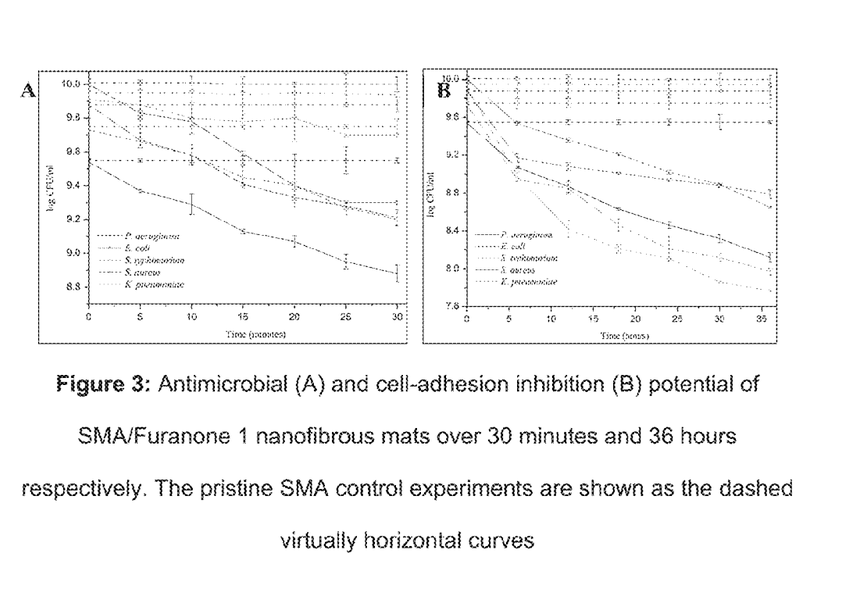
FIG. 3 shows antimicrobial (A) and cell-adhesion inhibition (B) potential of SMA/Furanone 1 nanofibrous mats over 30 minutes and 36 hours respectively.

SMA/Furanone 1 nanofibers showed up to 1.1 log reductions in populations of *P. aeruginosa* Xen 5, *E. coli* Xen 14, *S. typhimurium* Xen 26, *S. aureus* Xen 36 and *K. pneumoniae* Xen 39 after 30 minutes of exposure (FIG. 3A). The antimicrobial activity shown by these nanofibers after the first 15 minutes resulted in 0.5 log reduction in bacteria population for all the strains and gradually increased thus achieving at least 1 log reductions after 30 minutes of exposure. These nanofibers also inhibited cell-adhesion by strains of *P. aeruginosa* Xen 5, *E. coli* Xen 14, *S. typhimurium* Xen 26, *S. aureus* Xen 36 and *K. pneumoniae* Xen 39 by at least 2.5 log after 36 hours (FIG. 3B). Free furanone derivatives with 2(5H) cores have demonstrated antimicrobial activity against bacterial strains and even fungi. In zone inhibition tests, 4-amino-5-hydroxy-2(5H)-furanones demonstrated an average of 10 mm inhibition of *E. coli, S. aureus, P. aeruginosa, K. pneumonia* and *Enterobacter* spp. Work done by Lönn-Stenstud and coworkers also showed that this class of furanone compounds significantly reduced *P. aeruginosa* lung infection in mice. Even though these studies did not use similar techniques to quantify antimicrobial and cell-adhesion inhibition efficiencies, they showed convincingly that furanone derivatives with 2(5H) cores had antimicrobial properties.

Figure 4:
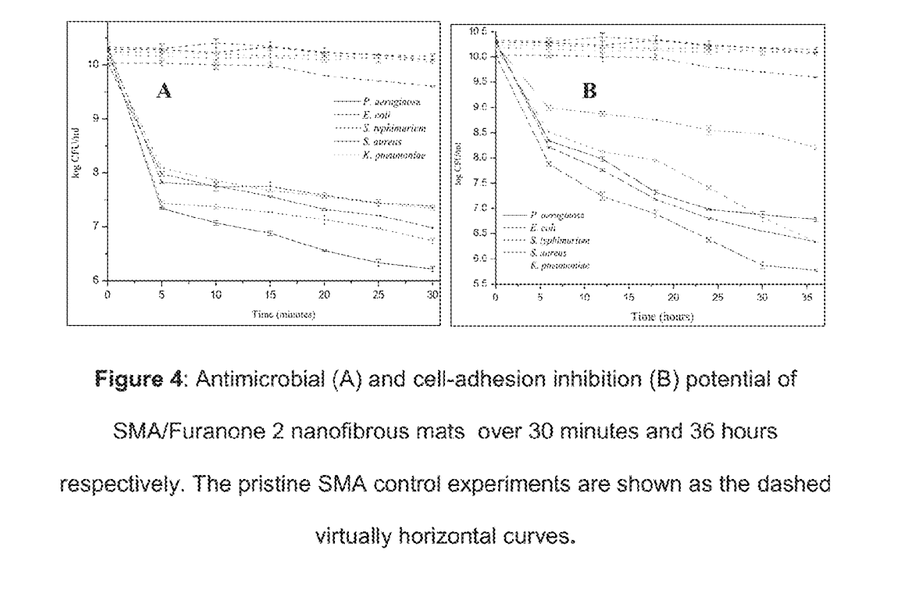
FIG. 4 shows antimicrobial (A) and cell-adhesion inhibition (B) potential of SMA/Furanone 2 nanofibrous mats over 30 minutes and 36 hours respectively.
Figure 7:
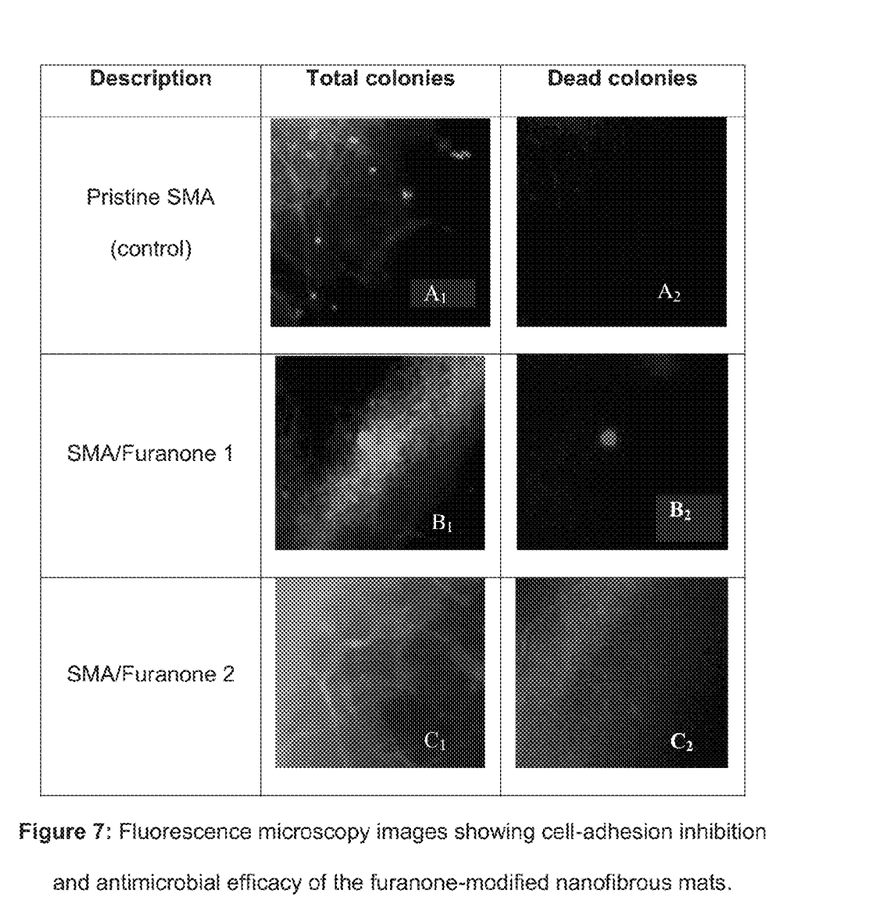
FIG. 7 shows fluorescence microscopy images showing cell-adhesion inhibition and antimicrobial efficacy of the furanone-modified nanofibrous mats.

Nanofibers made from SMA/Furanone 2 showed up to 4 log reductions in populations of *P. aeruginosa* Xen 5, closely followed by *S. typhimurium* Xen 26 which was reduced by up to 3.4 log after 30 minutes of exposure (FIG. 7A). *E. coli* Xen 14, *S. aureus* Xen 36 and *K. pneumoniae* Xen 39 were all reduced by at least 2.5 log after 30 minutes of exposure. All the strains were reduced by more than 2 log after the first 5 minutes. The SMA/Furanone 2 nanofibers also inhibited cell-adhesion by up to 3 log for all the strains over 36 hours of exposure (FIG. 4B). A lot of research has been done on the antimicrobial efficiency of synthetic and natural furanone derivatives with the 3(2H) core. One of the most interesting reports was published by Kataoka, where he investigated the composition of Japanese soy sauce, which amongst other properties has been found to be antimicrobial and anti-carcinogenic. This sauce was found to contain 4-hydroxy-2(or 5)-ethyl-5(or 2)-methyl-3(2H)-furanone (HEMF), 2,5-dimethyl-4-hydroxy-3(2H)-furanone (DMHF) and 4-hydroxy-5-methyl-3(2H)-furanone (HMF). This sauce has demonstrated up to 3 log reduction of strains *S. aureus, Shigella* spp., *Vibrio cholera, Salmonella* spp., and *E. coli* within 4-6 hours of contact. A similar study also demonstrated up to 4.5 log reductions in populations of *Klebsiella pneumoniae* Xen 39, *Staphylococcus aureus* Xen 36, *Escherichia coli* Xen 14, *Pseudomonas aeruginosa* Xen 5 and *Salmonella typhimurium* Xen 26. Sung and coworkers also reported exceptional antimicrobial efficacy of DMHF towards strains of *P. aeruginosa, S. aureus, E. coli* and *Enterococci*.

Figure 5:
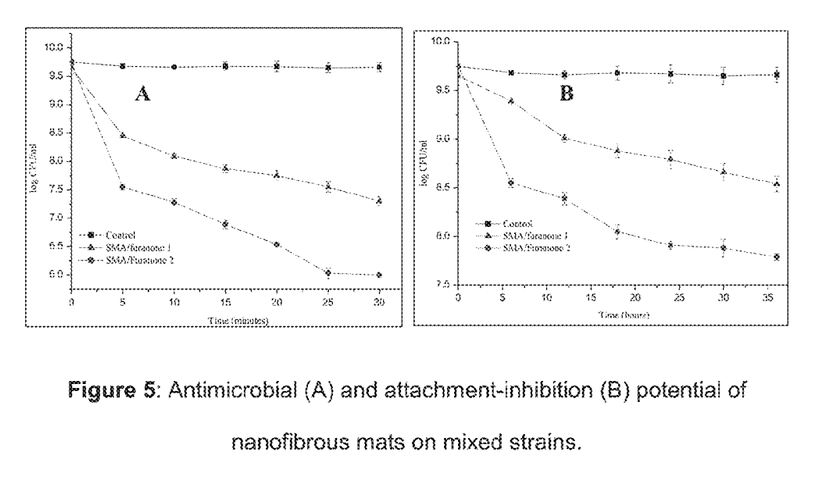
FIG. 5 shows antimicrobial (A) and attachment-inhibition (B) potential of nanofibrous mats on mixed strains.
Figure 8:
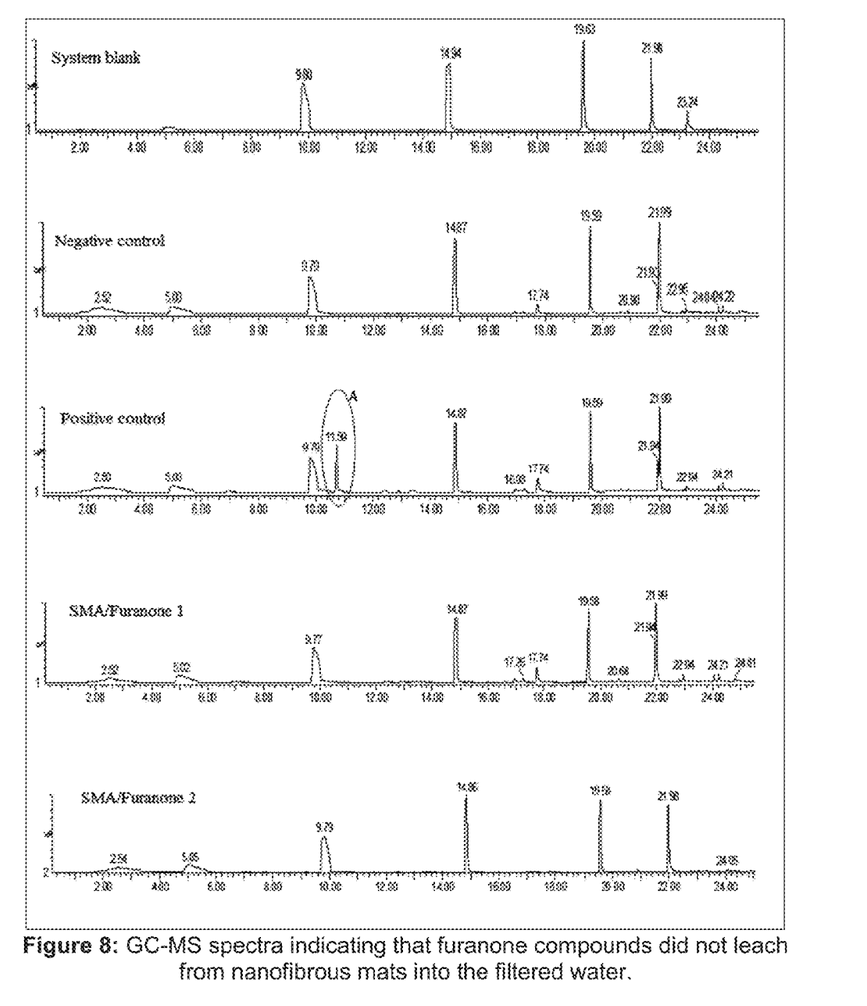
FIG. 8 shows GC-MS spectra indicating that furanone compounds did not leach from nanofibrous mats into filtered water.

SMA nanofibers containing Furanone 2 achieved antimicrobial activity of up to 3.75 log after 30 minutes of exposure to a mixed strain culture containing *P. aeruginosa* Xen 5, *E. coli* Xen 14, *S. typhimurium* Xen 26, *S. aureus* Xen 36 and *K. pneumoniae* Xen 39 cells (FIG. 8A). Those modified with Furanone 1 on the other hand achieved about 2 log reductions. FIG. 5B illustrates that the nanofibers derived from Furanone 2 modified SMA showed higher cell-adhesion inhibition efficiency (3 log) compared to those modified with Furanone 1, which demonstrated an inhibition of 1.2 log.

Bioluminescence Imaging

Figure 6:
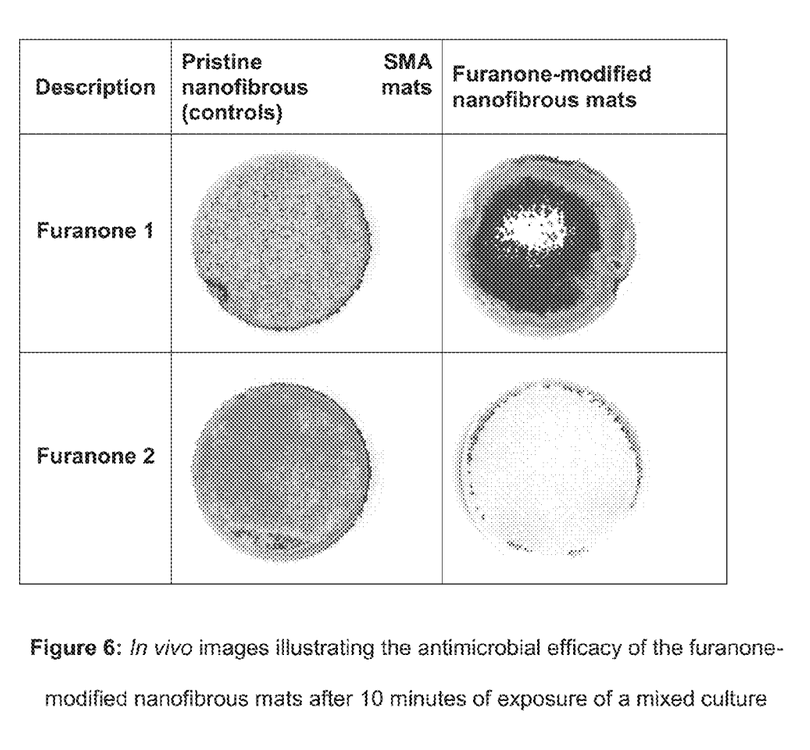
FIG. 6 is in vivo images illustrating the antimicrobial efficacy of the furanone-modified nanofibrous mats after 10 minutes of exposure of a mixed culture.

In vivo imaging of nanofibrous mats after exposure to a mixed strain culture of *P. aeruginosa* Xen 5, *E. coli* Xen 14, *S. typhimurium* Xen 26, *S. aureus* Xen 36 and *K. pneumoniae* Xen 39 was carried out to confirm the results obtained from plate counting. Nanofibrous mats made from SMA/Furanone 2 demonstrated high antimicrobial potential compared to those made from SMA/Furanone 1 (FIG. 6).

Fluorescence Microscopy

In FIG. 10, the fluorescence microscopy results after staining for live/dead cells are shown. The control SMA images indicated no antimicrobial or cell-adhesion inhibition capability in that the colonies attached to them did not absorb propidium iodide (red) dye, which would indicate cell death (FIG. 7 $A_1$ and 7 $A_2$). Furanone-modified nanofibers demonstrated inhibition of cell adhesion in that no colonization was visible (FIGS. 7 B and 7 C). These results also confirmed cell deactivation and this is indicated by the colony, which managed to attach to the nanofibers, but was deactivated (absorbed the red dye indicating cell death) (FIG. 7 $B_2$).

Leaching

GC-MS experiments were carried out to investigate the leaching of the furanone derivatives from the fibers. As expected for covalently bound compounds, the GC-MS results indicated that the furanone compounds did not leach into the filtered water. The characteristic signal observed at 11.59 minutes in the positive control (spiked with the furanone-derivative) was absent in all the leaching experiments (FIG. 8).

These results are promising in light of prior polymer compounds, where furanone molecules were coupled to a polystyrene back and showed leaching of the furanone molecules in between 65 to 85 days.

It will be apparent form the above that the furanone-modified SMA demonstrates good antimicrobial and cell-adhesion inhibition efficiency against *P. aeruginosa* Xen 5, *E. coli* Xen 14, *S. typhimurium* Xen 26, *S. aureus* Xen 36 and *K. pneumoniae* Xen 39 individually and in mixed cell culture form.

It will be appreciated that other compounds exist which fall within the scope of the invention. Also, it is not required to spin nanofibres with the compounds of the invention and they could be used in any suitable manner, including as surface coatings, dips and the like.

The invention claimed is:
1. A polymer compound with bacteria-adhesion inhibition properties having the formula wherein R is selected from

Furanone A and

Furanone B and wherein at least one of the substituents $R_1$, $R_2$, $R_3$, and $R_4$ is a linking group towards the polymer backbone and the remaining substituents are one or more of hydrogen, halide, alkyl, or aryl.

2. A polymer compound as claimed in claim 1 wherein the linking group is an alkyl chain.

3. A polymer compound as claimed in claim 1 wherein at least one of the remaining substituents $R_1$, $R_2$, $R_3$, and/or $R_4$ which is not a linking group towards the polymer backbone provides an external double bond which is present as a pendant group in the polymer.

4. A polymer compound as claimed in claim 1 wherein each R is the same or different along the polymer backbone.

5. A polymer compound as claimed in claim 1 wherein R is

6. A polymer compound as claimed in claim 1 wherein the linking group is an oligo(ethylene oxide) ((CH$_2$—CH$_2$—O)$_i$) moiety, wherein i=2.

7. A nanofibrous material which includes a polymer compound with bacteria-adhesion inhibition properties having the formula wherein R is selected from Furanone A and Furanone B and wherein at least one of the substituents $R_1$, $R_2$, $R_3$, and $R_4$ is a linking group towards the polymer backbone and the remaining substituents are one or more of hydrogen, halide, alkyl, or aryl.

8. A nanofibrous material as claimed in claim 7 wherein the linking group is an alkyl chain.

9. A nanofibrous material as claimed in claim 7 wherein at least one of the remaining substituents $R_1$, $R_2$, $R_3$, and/or $R_4$ which is not a linking group towards the polymer backbone provides an external double bond which is present as a pendant group in the polymer.

10. A nanofibrous material as claimed in claim 7 wherein each R is the same or different along the polymer backbone.

11. A nanofibrous material as claimed in claim 7 wherein R is

12. A nanofibrous material as claimed in claim 7, wherein the linking group is an oligo(ethylene oxide) ((CH$_2$—CH$_2$—O)$_i$) moiety, wherein i=2.

13. A polymer compound with bacteria-adhesion inhibition properties having the formula wherein R is

14. A nanofibrous material which includes a polymer compound with bacteria-adhesion inhibition properties having the formula wherein R is

* * * * *

UNITED STATES PATENT AND TRADEMARK OFFICE
CERTIFICATE OF CORRECTION

PATENT NO. : 9,457,321 B2
APPLICATION NO. : 14/415406
DATED : October 4, 2016
INVENTOR(S) : Lubertus Klumperman Page 1 of 1

It is certified that error appears in the above-identified patent and that said Letters Patent is hereby corrected as shown below:

On the Title Page

Item (73) Assignee: delete "UNIVERISTY" and insert --UNIVERSITY--, therefor.

Signed and Sealed this
Fourth Day of April, 2017

Michelle K. Lee
*Director of the United States Patent and Trademark Office*